Feb. 4, 1964     H. HOCH     3,120,489

FILTRATION METHODS AND APPARATUS

Filed May 12, 1960

INVENTOR
*Hans Hoch*

BY
*Mason, Fenwick & Lawrence*
ATTORNEYS

United States Patent Office 3,120,489
Patented Feb. 4, 1964

3,120,489
FILTRATION METHODS AND APPARATUS
Hans Hoch, Charlottesville, Va., assignor to Medical College of Virginia Foundation, Richmond, Va., a corporation of Virginia
Filed May 12, 1960, Ser. No. 28,638
8 Claims. (Cl. 210—70)

The present invention relates in general to filtration methods and apparatus, and more particularly to methods and apparatus for filtering fluids involving a filter pack or multistage assembly of membranes or filter septums.

Heretofore, multistage or multiple membrane filter packs have been designed for subjecting fluids to a plurality of stages of filtration to facilitate separation of components of fluids for studies of certain properties or characteristics of specimen fluids. Such filter packs usually comprise a succession of layers or stages or filtering membranes spaced from each other by substantially impermeable annular spacers or separators providing closed cylindrical cells or chambers between each filtering membrane. However, difficulties have been encountered in minimizing plugging of the pores of the filter membranes during the filtering operation to the extent necessary to avoid disturbance of the studies or determinations to be made. Also, in many studies with such filter packs, it is desirable to effect stirring of the solutions located in the cells or chambers between successive filtering membranes, for example to maintain homogeneity of the fluids in each cell.

An object of the present invention is the provision of a novel method and apparatus for filtering fluids in successive stages, involving a multistage filter assembly wherein effective stirring is achieved at each stage of the filter assembly.

Another object of the present invention is the provision of a novel method and apparatus for filtering specimen fluids through a multiple membrane filter pack in a manner minimizing plugging of the pores of the filter membranes.

Another object of the present invention is the provision of a novel method and apparatus for filtering specimen fluids through a multistage filter pack having a plurality of successive filtering membranes spaced from each other by spacers or separators providing closed cells between each membrane, and wherein the fluid in each cell is effectively stirred by an air bubble.

Other objects, advantages and capabilities of the present invention will become apparent from the following detail description, taken in conjunction with the accompanying drawing illustrating one preferred embodiment of the invention.

The present invention, in general, comprises a plurality of porous membranes arranged in succession and spaced from each other by substantially impervious spacer rings or separators creating a succession of closed cells or chambers between the porous membranes, all of the above being clamped together by suitable end plates and supported so as to be revolved along the surface of a cone without rotation about its own axis. The multiple membrane filter pack is loaded by filling each compartment successively with solvent which will serve as the medium of solution for the material which will be retained by the membranes in the process of filtration, so that a residual space forms an air bubble or gas bubble therein which will move about the cell when the filter pack is so revolved. When a sample is introduced at the top of the filter pack under pressure, the molecules may be caused to separate in accordance with their sizes and shapes, the moving air bubble functioning as a stirring mechanism within each cell which maintains effective stirring of the fluid therein and minimizes plugging of the pores. This maintains the homogeneity of the fluids within each cell which is necessary for efficient functioning of the filter pack and is essential for analytical studies to be conducted with the apparatus. The filter pack may be supported by a stationary clamp, located for example at the top or at the bottom or an intervening point along the filter pack, and the bottom or top end of the pack rotated around a circular path by an excenter arrangement of suitable design.

Figure 2:
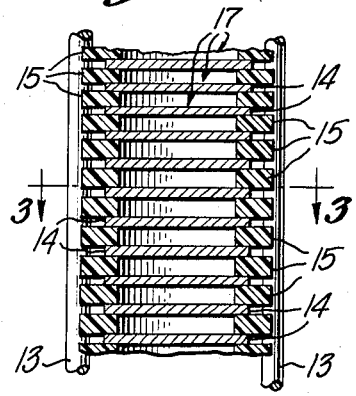
FIGURE 2 is a vertical transverse section view through a multiple membrane filter pack constructed in accordance with the present invention.
Figure 3:
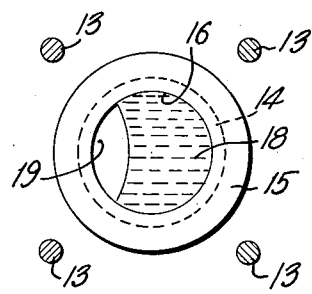
FIGURE 3 is a horizontal transverse section view taken along the line 3—3 of FIGURE 2.

Referring to the drawing, illustrating one form of apparatus which may be used, and specifically to the details of the filter pack illustrated in FIGURES 2 and 3, the multiple membrane filter pack indicated generally by the reference character 10 may comprise a pair of top and bottom end plates 11 and 12 respectively, releasably secured together by suitable bolts or bars 13 located about the circumference of the end plates and extending through accommodating apertures near the peripheries of the end plates. Clamped between the end plates 11 and 12 are a series of alternately arranged porous filter membranes 14 and plastic spacer rings 15, each of which has a substantially circular outer periphery in this exemplary embodiment, and the outer diameter of the rings 15 being greater than the diameter of the porous membranes 14. The spacer rings 15 have a circular bore 16 extending therethrough, which is of smaller diameter than the diameter of the porous membrane 14, and forms, in the assembled pack 10, a closed cell or chamber 17 between each successive pair of membranes 14. In the use of the apparatus, each cell 17 is filled with a liquid solvent, indicated by the reference character 18 in FIGURE 3, to a sufficient extent to leave a residual space forming a moving air bubble or gas bubble 19 in each cell which will shift about the cell as the filter pack is rotated. In the event a gas bubble is to be formed, the gas should have small solubility in the solution within the cells.

Figure 1:
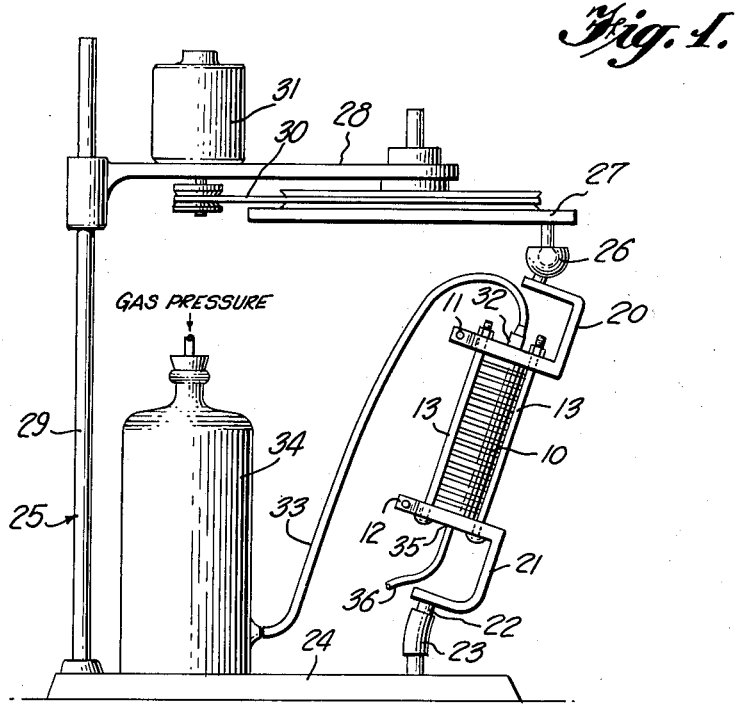
FIGURE 1 is a diagrammatic view of one form of apparatus which may be employed in practicing the present invention.

Referring now to FIGURE 1, the end plates 11 and 12 may be provided with extension arms 20 and 21 respectively, which may be of right-angular or L shape as illustrated in FIGURE 1, to facilitate supporting of the filter pack 10. The lower extension arm 21 may terminate in a downwardly extending pin or stub shaft 22 which is received in a piece of rubber tubing 23 to form a flexible connection to the base 24 of a suitable supporting stand 25 and the upper extension arm 20 may be connected by a conventional ball and socket joint 26 to an eccentric point on a driven disk 27 journaled for rotation about a vertical axis in an arm 28 extending from the post 29 of the stand 25 and driven by a suitable belt and pulley drive indicated at 30 from a motor 31. The top end plate 11 will have a suitable inlet opening indicated at 32 through which the specimen fluid is admitted to the filter pack, the inlet opening 32 being connected for example by flexible tubing 33 to a suitable supply container 34 for the specimen fluid to which gas pressure is applied so that the specimen fluid is forced through the filter pack under desired pressure. The bottom end plate 12 is provided with a centrally located outlet opening 35 connected by suitable flexible tubing 36 to a collecting vessel or other desired apparatus for further processing or measuring the outflow.

The cells of the filter pack can be loaded so as to provide the residual air spaces by placing a wetted membrane in position, pressing one of the spacer rings against the membrane, and pipetting the appropriate amount of fluid into the still open compartment space or cell, then placing a second wetted membrane over the spacer ring, thus covering the partially loaded cell and leaving the air space in the compartment. The next spacer ring can then be placed over and pressed against the second membrane, the appropriate amount of fluid pipetted into the now formed and still open second compartment or cell, and the process continued for this and the following compartments or cells as described for the first compartment. In some instances it is more convenient to assemble the multistage filter pack in an upside-down position. It is not necessary, but is practicable, to wet the membranes before mounting them in the loaded filter pack, because some membranes change their dimensions on wetting. If such membranes were mounted while dry, they may wrinkle or tear when they become wet during the filling procedure.

It will be appreciated that operation of the above-described apparatus with the motor 31 and the belt and pulley drive 30 selected to produce a desired rate of rotation, will effect rotation of the filter pack 10 along the surface of a cone whose vertex is at the flexible joint 23, without effecting rotation of the filter pack 10 about its own axis, and produce such movement of the air bubble 19 in each of the cells 17 as will effect continuous stirring of the fluid within each cell to maintain homogeneity of the fluids and minimize plugging of the pores.

The filter membranes 14 are chosen to prevent escape of the air or gas forming the stirring bubble after the dynamic steady state conditions are reached, except when the air or gas is dissolved in the liquid solvent. While the air or gas spaces in the cells 17 may reduce somewhat in size during the initial period of the filtration as the pressure on the system is increased, the bubbles are maintained after the dynamic steady state conditions are reached. The solvent in any cell 17 passes through the membrane during filtration at the same rate at which it is replaced from a foregoing cell, so that the volume of the solvent remains the same in each cell.

Membranes which can be used for various studies are cellophane, chemically treated cellophane membrane filters type O (Schleicher and Schuell) and also special filter paper.

While the central zones of porous membranes 14 coextensive with the bores 16 of the spacer rings is shown as free of support, it may be desirable in some circumstances to provide support for the membranes over their whole area as by perforated thin walls or skeleton frames or spiders extending from the spacer rings or disposed between a spacer ring and an adjacent membrane to span the bore 16 and resist stretching of the membrane under pressure.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. The method of filtering a specimen fluid comprising the steps of forming a multistage filter pack having a plurality of parallel filter membranes arranged in succession along a selected axis in transverse relation to the axis and annular spacer members interposed between each successive pair of membranes forming a closed cell therebetween, loading each of said cells with a fluid solvent to an extent leaving a residual air space in each cell which forms an air bubble, the filter membranes having the property of preventing escape of the air forming the bubble from the cells except when dissolved in the solvent maintaining said bubble in each of the cells during the forced passage of the fluid therethrough, and revolving said multistage filter pack in a direction to shift said selected axis thereof along a path describing the surface of a cone without rotating the filter pack about said selected axis while forcing a specimen fluid under pressure therethrough to cause the air bubbles to stir the fluid in their associated cells.

2. Multistage filtering apparatus comprising a plurality of filter membranes arranged in parallel relation to each other spaced along and lying transversely of a selected flow axis, hollow cored spacer members spacing said membranes from each other and providing a closed cell between each successive pair of membranes, each of said cells being loaded by partially filling the same with a selected amount of fluid solvent leaving a residual air space providing an air bubble in each cell, the filter membranes having the property of preventing escape of the air forming the bubble from the cells except when dissolved in the solvent means including the membranes to maintain the air bubbles in the cells during the forced passage of fluid in the cells, means for holding said plurality of membranes and interposed spacer members in a rigid, axially elongated assembly, means for supporting said assembly at two axially spaced points including means for maintaining one of said supporting points stationary and means for shifting the other of said supporting points through a circular path to cause the portion of the assembly extending between said supporting points to revolve in a conical path and impart stirring motion to said air bubbles in said cells, and means for forcing a specimen fluid under pressure through said assembly along said flow path.

3. Filtering apparatus comprising a multistage filter pack having a plurality of parallel filter membranes arranged in succession along a selected flow axis in transverse relation thereto and annular spacer members interposed between each successive pair of said membranes forming a closed cell therebetween, end plates at the opposite ends of said filter pack having releasable and adjustable means interconnecting said end plates for holding said filter membranes and annular spacer members in a rigid assembly therebetween, each of said cells being loaded by partially filling the same with a selected amount of fluid solvent leaving a residual air space providing an air bubble in each cell, the filter membranes having the property of preventing escape of the air forming the bubble from the cells except when dissolved in the solvent means including the membranes to maintain the air bubbles in the cells during the forced passage of the fluid in the cells, means for supporting said multistage filter pack for revolution about a generally vertical axis including flexible joint means intercoupled with one of said end plates and establishing a stationary supporting point for said filter pack located on said vertical axis of revolution, rotating means for imparting motion to said filter pack at a point axially spaced from said stationary supporting point including means driven in a circular path concentric with said vertical axis of rotation and connected by movable joint means with the other of said end plates for shifting said filter pack along a path describing the surface of a cone to revolve the air bubble in each of said cells in a circular path about the cell and impart stirring motion to the air bubbles, and means for forcing a specimen fluid under pressure through said filter pack during revolution of the same.

4. Filtering apparatus comprising a multistage filter pack having a plurality of parallel filter membranes arranged in succession along a selected flow axis in transverse relation thereto and annular spacer members interposed between each successive pair of said membranes forming a closed cell therebetween, upper and lower end plates at the opposite ends of said filter pack having releasable and adjustable means interconnecting said end plates for holding said filter membranes and annular spacer members in a rigid assembly therebetween, each of said cells being loaded by partially filling the same with a selected amount of fluid solvent leaving a residual air space providing an air bubble in each cell, the filter membranes having the property of preventing escape of the air forming the bubble from the cells except when dissolved in the solvent means including the membranes to maintain the air bubbles in the cells during the forced passage of fluid in the cells, means for supporting said multistage filter pack for revolution about a generally vertical axis including flexible joint means intercoupled with said lower end plate and establishing a stationary supporting point for said filter pack located on said vertical axis of revolution, rotating means for imparting motion to said filter pack including means above said filter pack driven in a circular path concentric with said vertical axis of rotation and connected by ball and socket joint means with the upper end plate for shifting said filter pack along a path describing the surface of a cone having its vertex at said stationary supporting point to revolve the air bubble in each of said cells in a circular path about the cell and impart stirring motion to the air bubbles, and means for forcing a specimen fluid under pressure through said filter pack during revolution of the same.

5. The method of filtering a specimen fluid comprising the steps of loading a plurality of independent cells serially arranged along a selected flow axis and separated from each other by filter membranes by partially loading each of the cells with a fluid solvent to a level to provide a gaseous bubble therein, maintaining said bubble in each cell when a specimen fluid is forced therethrough under pressure, and revolving the plurality of cells as a unit along a path causing the gaseous bubble in each cell to orbit about the center of the cell while forcing a specimen fluid under pressure therethrough along the flow axis to cause the gaseous bubble to stir the fluid in their associated cells.

6. Multistage filtering apparatus comprising a plurality of filter membranes arranged in parallel relation to each other spaced along and lying transversely of a selected flow axis, hollow cored spacer members spacing said membranes from each other and providing a closed cell between each successive pair of membranes, each of said cells having a selected amount of fluid solvent therein which only partially fills the cell and having a residual air space providing an air bubble in each cell which persists upon passage of a specimen fluid under pressure through the cells, means including the membranes to maintain the air bubbles in the cells during the forced passage of fluid in the cells, means for holding said plurality of membranes and interposed spacer members in a rigid, axially elongated assembly, means for supporting said assembly at two axially spaced points including means for maintaining one of said supporting points stationary and means for shifting the other of said supporting points through a circular path to cause the portion of the assembly extending between said supporting points to revolve in a conical path and impart stirring motion to said air bubbles in said cells, and means for forcing a specimen fluid under pressure through said assembly along said flow path.

7. Filtering apparatus comprising a multistage filter pack having a plurality of parallel filter membranes arranged in succession along a selected flow axis in transverse relation thereto and annular spacer members interposed between each successive pair of said membranes forming a closed cell therebetween, end plates at the opposite ends of said filter pack having releasable and adjustable means interconnecting said end plates for holding said filter membranes and annular spacer members in a rigid assembly therebetween, each of said cells having a selected amount of fluid solvent therein which only partially fills the cell and having a residual air space providing an air bubble in each cell which persists upon passage of a specimen fluid under pressure through the cells, means including the membranes to maintain the air bubbles in the cells during the forced passage of fluid in the cells, means for supporting said multistage filter pack for revolution about a generally vertical axis including flexible joint means intercoupled with one of said end plates and establishing a stationary supporting point for said filter pack located on said vertical axis of revolution, rotating means for imparting motion to said filter pack at a point axially spaced from said stationary supporting point including means driven in a circular path concentric with said vertical axis of rotation and connected by movable joint means with the other of said end plates for shifting said filter pack along a path describing the surface of a cone to revolve the air bubble in each of said cells in a circular path about the cell and impart stirring motion to the air bubbles, and means for forcing a specimen fluid under pressure through said filter pack during revolution of the same.

8. The method of filtering a specimen liquid comprising the steps of loading a plurality of independent cells serially arranged along a selected flow axis and separated from each other by filter membranes by partially loading each of the cells with a liquid solvent to provide a bubble of gaseous phase fluid therein, maintaining the gaseous bubble in each of the cells during the forced passage of the liquid therethrough, the filter membranes having the property of preventing escape of the gaseous phase liquid forming the bubble except when dissolved in the liquid solvent and said fluid being substantially emissible in said solvent, and revolving the plurality of cells as a unit along a path describing the surface of a cone while forcing a specimen liquid under pressure therethrough along the flow axis to cause the gaseous bubbles to stir the liquid in their associated cells.

References Cited in the file of this patent
UNITED STATES PATENTS

| 1,655,774 | Sansarico | Jan. 10, 1928 |
| 2,327,803 | Kidd | Aug. 24, 1943 |